(12) United States Patent
Therrien et al.

(10) Patent No.: US 9,969,418 B2
(45) Date of Patent: May 15, 2018

(54) STROLLER SHADE

(71) Applicant: Skip Hop, Inc., New York, NY (US)

(72) Inventors: Peter Therrien, Brooklyn, NY (US);
Rahnee Butler, Hawthorne, NY (US);
Ellen Diamant, New York, NY (US);
Benjamin Bearsch, Brooklyn, NY (US); Janet Villano, Jersey City, NJ (US)

(73) Assignee: SKIP HOP, INC., New York, NY (US)

( * ) Notice: Subject to any disclaimer, the term of this patent is extended or adjusted under 35 U.S.C. 154(b) by 0 days. days.

(21) Appl. No.: 15/061,676

(22) Filed: Mar. 4, 2016

(65) Prior Publication Data

US 2017/0253261 A1 Sep. 7, 2017

(51) Int. Cl.
*B62B 9/14* (2006.01)

(52) U.S. Cl.
CPC .................... *B62B 9/142* (2013.01)

(58) Field of Classification Search
CPC ...................................... B62B 9/142
See application file for complete search history.

(56) References Cited

U.S. PATENT DOCUMENTS

| 4,426,113 | A | 1/1984 | Schutz |
| 4,533,170 | A | 8/1985 | Banks |
| D319,202 | S | 8/1991 | Reinhart |
| 5,184,865 | A | 2/1993 | Mohtasham |
| 5,542,732 | A | 8/1996 | Pollman |
| 5,975,558 | A | 11/1999 | Sittu |
| 6,155,628 | A * | 12/2000 | Williams ............... B62B 9/142 280/47.38 |
| 6,224,073 | B1 | 5/2001 | Au |
| 7,052,085 | B2 | 5/2006 | Marie |
| 7,150,499 | B2 | 12/2006 | McGregor |
| D619,939 | S | 7/2010 | Olsen |
| 2012/0111384 | A1 | 5/2012 | Hanks |
| 2012/0286547 | A1 | 11/2012 | Gibbons |
| 2013/0036623 | A1* | 2/2013 | Kraetsch ............... D06F 59/02 34/381 |

* cited by examiner

*Primary Examiner* — D Glenn Dayoan
*Assistant Examiner* — Melissa A Black
(74) *Attorney, Agent, or Firm* — Stephen J. Weyer, Esq.; Stites & Harbison, PLLC.

(57) ABSTRACT

A stroller shade includes a unique clamp for attaching the shade to a stroller. The clamp has an inner clip and an outer clip. The outer clip selectively locks in place over the inner clip to prevent the inner clip from opening. When the outer clip is slid in a direction opposite an opening of the inner clip, one can open the inner clip to slide over a stroller bar to thereby allow one to clamp on a bar of a stroller thereby allowing one to attach the stroller shade to a stroller. The stroller shade attaches to a stroller to cover the seat area, in a first position, and rolled up, and held in place, to a top portion of a stroller, in a second position, while the stroller shade remains attached to the stroller, e.g. along a top portion of the stroller shade.

24 Claims, 7 Drawing Sheets

STROLLER SHADE

FIELD OF THE INVENTION

The present invention relates to a shade for placement over a stroller and in particular a stroller shade with clips for removably attaching the shade to a stroller to provide protection for an infant placed in the stroller.

BACKGROUND OF THE INVENTION

Strollers are used for taking infants and toddlers for walks. A typical stroller has a frame with handles to push the stroller, wheels and a seat for an infant or toddler. In order to protect a child from the elements such as sunshine rain and snow, etc., stroller shades or covers have been developed which fit over the seat area of a stroller covering an infant or toddler sitting in the stroller seat to protect or shield the child from the elements such as the sun, rain, snow, etc.

SUMMARY OF THE INVENTION

The present invention is directed to a unique clamp which advantageously allows one to removably attach a stroller shade to a stroller. In addition, the present invention is directed to a combination of a stroller shade with the unique clamp which allows for one to removeably attach the stroller shade to a stroller. Further, the present invention is directed to a stroller shade which attaches to a stroller to cover the seat area, in a first position, and rolled up, and held in place, to a top portion of a stroller, in a second position, while the stroller shade remains attached to the stroller, e.g. along a top portion of the stroller shade.

The present invention, in one form thereof, is directed to a clamp which can be used for attaching a stroller shade to a stroller. However, the clamp could be used in other areas beyond attaching a stroller shade to a stroller. The clamp includes an inner clip and an outer clip. The inner clip has an inner clip top member and an inner clip bottom member pivotally joined to each other at one end forming a closed inner clip end and an open inner clip end opposite the closed inner clip end. The inner clip top member and the inner clip bottom are separable at the inner clip open end to accommodate sliding placement on a bar such as but not limited to a stroller bar. The outer clip has an outer clip top portion and an outer clip bottom portion joined together at an outer clip closed end and having an outer clip open end opposite the outer clip closed end. The outer clip has a sufficient size to slidingly fit over the inner clip top member and the inner clip bottom member. The outer clip bottom portion has a wider width at the open end than the closed end. A pair of channels are formed on either side of the inner clip bottom member to accommodate the wider width portion of the outer clip bottom member to allow sliding of the outer clip relative to the inner clip within the channels. The pair of channels have respective ends proximate the inner clip closed end which abut the wider width portion of the outer clip when the outer clip is slid in a direction toward the open end to thereby prevent the outer clip from completely sliding away from the inner clip when sliding the outer clip in the direction of the inner clip closed end.

In one specific further embodiment, each of the channels of the clamp are formed as slots through part of the inner clip bottom member which extends radially below a remaining portion of the inner clip bottom member in the direction of the outer bottom member wherein the wider width portion of the outer clip slides in the slot. In one further specific form, the slots are completely through the inner clip bottom member and the slots can accommodate a strap which can pass therethrough.

The clamp in yet another alternative advantageous embodiment, has the outer clip top member with a tab extending radially inward toward the inner clip top member. The inner clip top member has a complementary surface to that of the tab for releasably locking the outer clip to the inner clip. In one further form, the complementary surface (i.e. of the inner clip) is formed by a portion of a surface of the inner clip, facing the outer clip, being lower than a remaining portion of the inner clip. This arrangement forms a "step" or ledge, upon which the tab engages when locking the outer clip to the inner clip.

The clamp in yet a further alternative further form, includes an elastic strap attached at one end of the inner clip and releasably attached to the inner clip on another end of the elastic strap (i.e. "free end") to selectively form a loop. In a still further form, the inner clip upper member has a hook extending radially in a direction opposite the inner clip bottom member, in which the hook accommodates the "free" end of the strap to selectively form the loop. In one advantageous form, the strap is a band, attached at one end to the clamp, and free on an end opposite the attached end allowing the free end of the band to fit over the hook of the inner clip upper member.

The present invention, in another form, is directed to a stroller shade which includes a sheet and a plurality of clamps for attaching the sheet to a stroller by clipping the sheet to parts of a stroller. The sheet is composed of a breathable material. The clamps each have an inner clip having an inner clip top member and an inner clip bottom member pivotally joined to each other at one end forming a closed inner clip end and forming an open clip end opposite the closed inner clip end. The inner top member and the bottom top member are separable at the inner clip open end to accommodate sliding placement on parts of a stroller, such as a top stroller bar over the stroller seat. Each clamp also has an outer clip having an outer clip top portion and an outer clip bottom portion joined together at an outer clip closed end and having an outer clip open end opposite the outer clip closed end. The outer clip has as sufficient size to slidingly fit over the inner clip top member and inner clip bottom member. The bottom member has a wider width portion at the open end than the closed end.

In an alternative further form, the stroller shade sheet has a mesh window. In one further form, a panel is attached on at least one end to the sheet over the mesh window for selectively covering the mesh window. In one further advantageous form, the panel is selectively attached to the sheet at an end opposite the end of the panel attached to the shade using a magnetic fastener.

The stroller shade in yet another advantageous form includes a strap (e.g. an elastic strap) attached to the inner clip of the clamps and is releasably attached to the clamps' inner clips at an end (e.g. a "free" end) to selectively form a loop. In one further form, the clamps have a hook which is part of the inner clip upper member, extending radially upwards in a direction opposite the bottom member for accommodating an end of the strap (e.g. the "free" end) to selectively form the loop. In yet another advantageous form, the sheet can be rolled up starting at one end towards the other end to form a scroll and one or more elastic straps can form one or more respective loops around the scroll to prevent the scroll from unrolling.

The present invention, in another form thereof, relates to a stroller shade having a sheet composed of a breathable material, and a top portion and a bottom portion. The bottom portion has a suitable dimension for fitting on a stroll proximate its seat. A plurality of clamps join to the sheet, proximate the top portion of the sheet, for selectively clipping the sheet to a stroller. A plurality of straps are connected to the clamps. The sheet can be rolled up, starting from the bottom portion, toward the top portion, to form a scroll and held to the clamps using the straps associated with respective clamps. In one advantageous further form, an elastic strip is joined to the bottom portion of the sheet for allowing tight connection of the sheet to a stroller at the bottom portion of the sheet. In a different, further embodiment, a plurality of straps are elastic, and advantageously, the elastic straps are in the form of a loop which can stretch around the sheet when rolled as a scroll, and attached over a portion of the clamp to keep the sheet rolled up as the scroll. This allows the stroller shade to be rolled up while the shade remains attached to the stroller.

BRIEF DESCRIPTION OF THE DRAWINGS

The present invention will now be described with regard to the figures as identified below.

FIGS. 9a-9c illustrate steps form attaching the clamp of FIG. 2 to a stroller in accordance with the present invention where

FIGS. 10a-10c show steps in installing the stroller shade with clamps onto a stroller where

FIGS. 12a-12c shows steps for rolling up an installed stroller shade, in accordance with the present invention, in which

DETAILED DESCRIPTION

Figure 1:
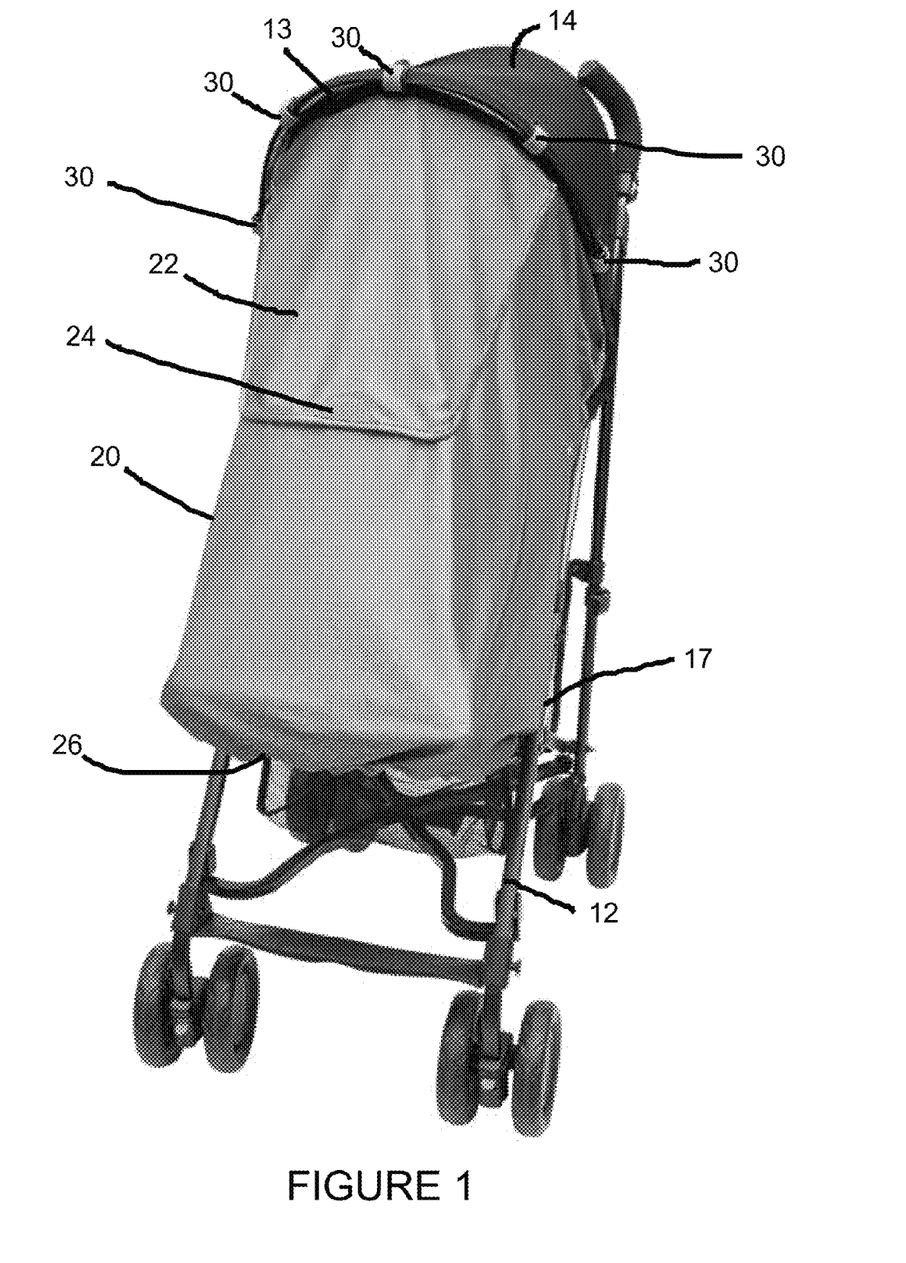
FIG. 1 shows a stroller shade attached to a stroller in accordance with the present invention.
Figure 2:
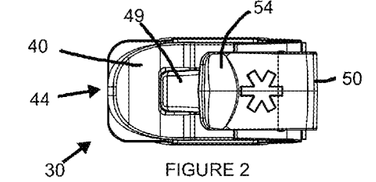
FIG. 2 is a top plan view of a clamp in accordance with the present invention.
Figure 3:
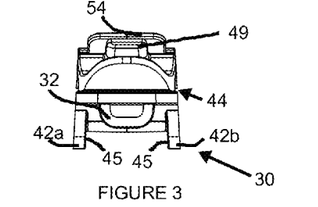
FIG. 3 is a front elevation view of the clamp of FIG. 2.

The present invention will now be described with regard to the Figures. Referring specifically to FIG. 1, stroller shade 10 is shown attached to a stroller 12. Stroller shade 10 includes a breathable sheet 20 and clamps 30 which allow one to clip the stroller shade 10 to the stroller 12. The stroller shade 10 is clipped to the stroller 12 at stroller bar 13, part of a frame of the stroller 12 to which stroller canopy 14 is attached.

Figure 11:
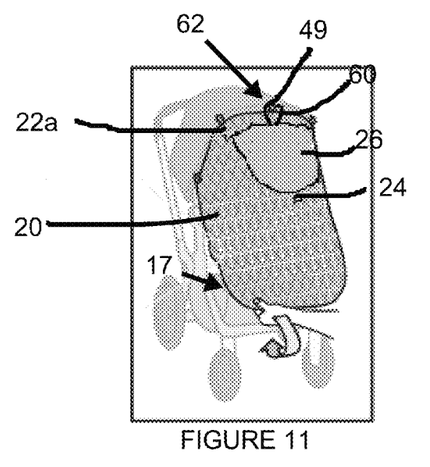
FIG. 11 shows the stroller shade with mesh window in accordance with another aspect of the present invention.

A removable panel 22 covers a mesh window (see e.g. FIG. 11 and the discussion to follow). The panel 22 is kept in place over the mesh window using a magnetic fastener 24. A strip of elastic 26 is located at a bottom of the sheet 20 to allow the sheet 20 to fit securely to a bottom seat part 17 of the stroller to accommodate different sized strollers. A combination of clamps 30 clipped to stroller bar 13 and elastic 26 of sheet 20 pulled down below the stroller seat 17, allow the sheet 20 to be pulled tight to fit on the stroller 12.

Referring now to FIGS. 2-8, clamp 30 has an inner clip 40 and an outer clip 50. Inner clip 40 has an inner clip top member 41 and an inner clip bottom member 42 pivotally joined to each other by hinge 43. The inner clip 40 has a closed end proximate the hinge 43. Advantageously, the inner clip 40 is composed of a plastic or other suitable flexible material which allows for movement of the inner clip top member 41 relative to the inner clip bottom member 42. A pair of slots 45 (45a, 45b) are formed by a portion of the inner clip bottom member 42 which extends radially downward away from a remaining portion of the inner clip bottom 42.

The outer clip 50 is advantageously a single continuous member forming an outer clip top 51 and an outer clip bottom portion 52. The outer clip 50 has a closed end 53 and an open end 54.

The outer clip bottom portion 52 has an end portion 55 which is wider than a remaining portion 52a of the outer clip bottom portion. The wider portion 55 fits in the slot 45 which acts as a channel for the wider portion 55 to slide.

The wider portion 55 has an end surface 56 which abuts slot surface 46 of inner clip 40 to prevent the outer clip 50 from sliding completely off of the inner clip 40 when one slides the outer clip 50 in a direction towards the closed end of the inner clip proximate the hinge 43 and opposite the open end 44.

Figures 4, 5, 6, 7, 8:
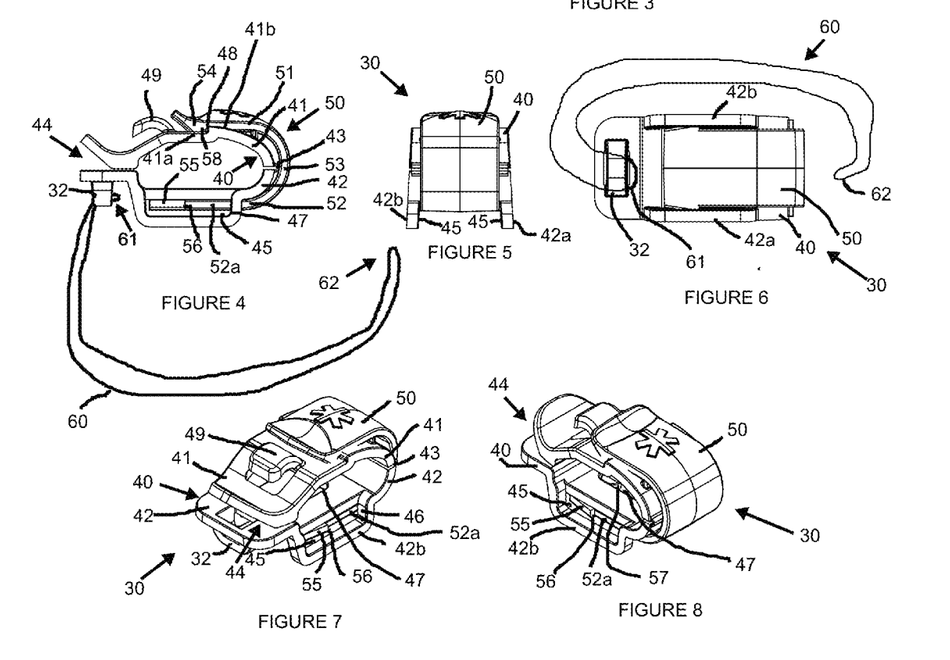
FIG. 4 is a left elevation view of the clamp of FIG. 2.
FIG. 5 is a rear elevation view of the clamp of FIG. 2.
FIG. 6 is a bottom plan view of the clamp of FIG. 2.
FIG. 7 is a perspective view of the clamp of FIG. 2 shown from the top, front and left sides.
FIG. 8 is another perspective view of the clamp of FIG. 2 shown from the top, left and rear sides.

In addition, further assisting in the easy gliding/sliding of the outer clip 50 relative to the inner clip 40 is provided by a slot 47 in the inner bottom member 42 and a upward extending post 58 of the outer clip bottom part 52 best shown in FIG. 8.

A tab 58 selectively locks the outer clip 50 to the inner clip 40. Tab 58 locking engages with a complementary surface 48 of the inner clip top member 41. For example, as shown, the complementary surface 48 is formed by a portion 41a which is lower than a remaining portion 41b of the inner clip top member. The lower portion 41a forms a step or ledge with the remaining portion 41b which is complementary to surfaces of the tab 58.

A elastic strap 60 is a band, attached to the clamp 30 at strap end 61 through slot 32. The elastic strap 60 can either be permanently tied to the clamp 30 through slot 32 or the end 61 of the strap 60 can be threaded through the slot 32 and the end 61 fed around through the opposite end of the strap 60 to removably join the strap to slot 32. An opposite end 62 of strap 60 can releasably fit over hook 49. Advantageously, since the strap 60 is a continuous band, end 62 can fit on hook 49 to, in turn, form a loop extending from end 61 to end 62 (see e.g. as shown in FIG. 11).

Figure 9A:
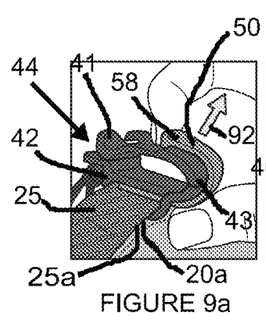
FIG. 9a illustrates initial opening of a clamp.
Figure 9B:
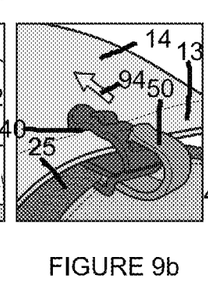
FIG. 9b shows a clamp opened and slid on a bar of a stroller prior to locking the clamp shut/closed for attachment of a shade to the stroller and FIG. 9c shows the clamp in its final position locked to hold the shade in place on a stroller in accordance with the present invention.
Figure 9C:
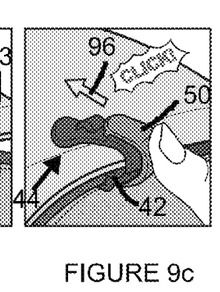

Referring now to FIGS. 9*a*-9*c*, along with FIG. 1, a series of clamps 30 are disposed along a perimeter of the stroller shade 10 at its top, opposite the strip of elastic 26. Referring specifically to FIG. 9*a*, each clamp 30 is joined to the sheet 20 via a strip 25, located along a perimeter of the sheet 20, which passes through the slots 45. As a result, the clamp 30 can slide along the strip 25 thereby allowing one to adjust a position of clamp 30 along the perimeter of the sheet 20. In one advantageous form, the strip 25 is one half of a complementary hook and look fastener system such as but not limited to Velcro®. Accordingly, strip 25 can have a loop surface 25*a* which mates with a complementary hook surface 20*a* of the sheet 20. A more complete description of this feature is discussed below with reference to FIG. 10*b*. See e.g. FIG. 10*b*.

In order to attach a clamp 30 to a stroller bar, one lifts up and back on tab 58 of the outer clip top portion 51 in direction 92, away from the inner clip top member 41 and in a direction of the hinge 43 and away from the open end 44 of the inner clip 40 as shown in FIG. 9*a*. This results in the inner clip top member 41 pivoting at hinge 43 away from inner clip bottom member 42.

Next as shown in FIG. 9*b*, the open end 44 is slid over a stroller bar 13 to which canopy 14 is disposed in direction 94. Finally as shown in FIG. 9*c*, the outer clip 50 is slid back over the inner clip 40 in direction 96 towards the open end 44 of the inner clip 40 continuing in direction 94 until a "click" is heard indicating that the tab 58 had cleared the inner clip raised surface 41*b* and now is abutting the inner clip top member lower surface 41*a* and the step or ledge spanning between the lower surface 41*a* and remaining or raised surface 41*b*.

Figure 10A:
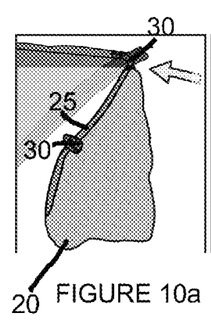
FIG. 10a shows a first clamp attached to a stroller.
Figure 10B:
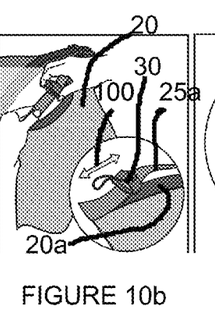
FIG. 10b shows adjustment of a second clamp along a perimeter of the stroller shade prior to being clipped to the stroller and FIG. 10c shows further installation of the stroller shade on a stroller in a more complete state in accordance with the present disclosure.
Figure 10C:
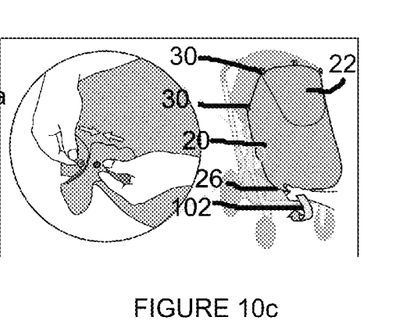

Referring now to FIGS. 10*a* and 10*b*, as previously noted, each clamp 30 is adjustable along a top perimeter of sheet 20, along a respective strip 25, to allow adjustment of a location of a clamp 30 along the top perimeter of the sheet 20. For example, strip 25 can be separated from the sheet 20 by separating loop surface 25*a* from hook surface 20*a*, as shown in FIG. 10*b* and indicated by arrow 100. After one locates a position where the clamps 30 should be located, one applies each clamp 30 one by one to stroller bar 13 to apply the shade 10 to the top bar 13 of stroller 12 as shown in FIG. 10C. Finally, one pulls down a bottom portion of the sheet 20 in direction 102, proximate the elastic strip 26 end, in order for the elastic strap 26 end to be disposed over a bottom portion of the stroller at bar 17 located below the seat of stroller 12.

Referring now to FIG. 11, if desired, one can roll up panel 22 which covers mesh window 25. The panel 22 forms a roll identified as 22A in FIG. 11 and held in place using elastic strap 60 which loops around the roll 22*a* and attaches to hook 49 as shown in FIG. 11.

Figure 12A:
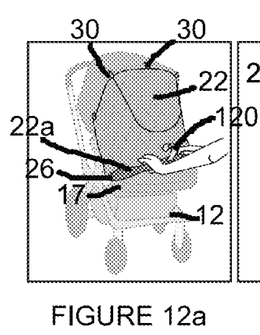
FIG. 12a shows initial rolling of the stroller shade.
Figure 12B:
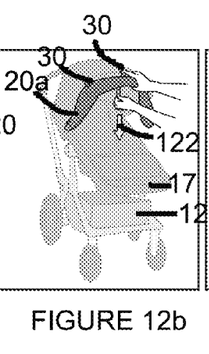
FIG. 12b shows and intermediate transformation.
Figure 12C:
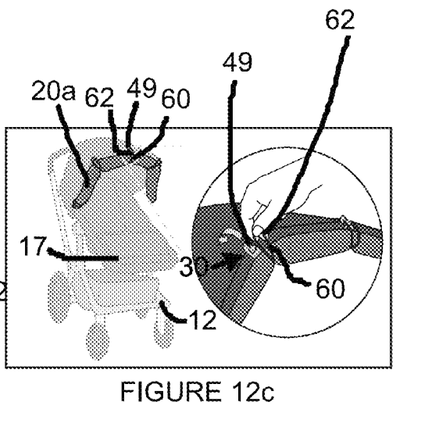
FIG. 12c shows the shade completely rolled up and held in place in accordance with the present invention.
Figure 13:
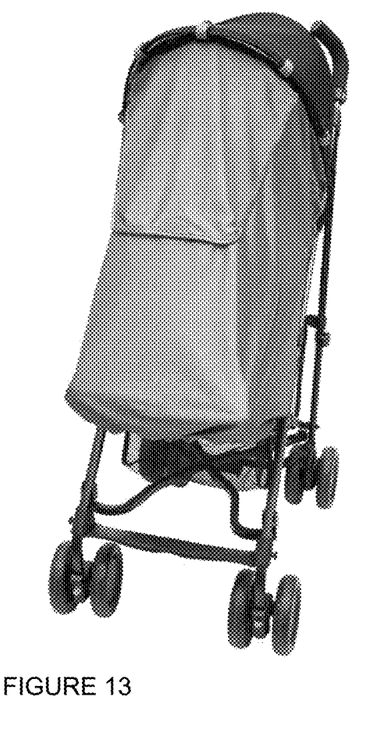
FIG. 13 is a perspective view taken from the front, left side and top side of the stroller shade in accordance with the present invention.
Figure 14:
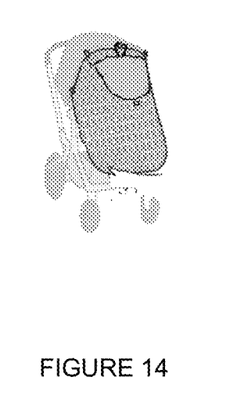
FIG. 14 is another perspective view taken from the front, right side and top side of the stroller shade shown with panel rolled up in accordance with the invention.
Figure 15:
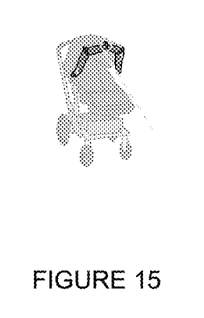
FIG. 15 is a different perspective of the stroller shade in FIG. 13, viewed from the front, right side and top side, shown completely rolled up and attached to a stroller, in accordance with the present invention.

Referring now to FIGS. 12*a*-12*c*, one can roll up the entire sheet 20 while it remains attached to the stroller at a top portion of the sheet 20, where the clamps 30 attached the sheet 20 to the stroller 12. FIG. 12*a* shows the shade in a first position, completely over the seat 17 of stroller 12. To transform the stroller shade to its second, rolled up position, on first pulls the sheet 20 away from the bottom of the stroller below seat 17, near elastic strip 26 and rolling the sheet 20 as shown by arrow 120 in FIG. 12*a*. One proceeds to roll the sheet 20 until one reaches the top canopy 14 of the stroller 12 as shown in FIG. 12*b* to form scroll 20*a*. Next, one pulls respective elastic straps 60 down in a direction 122 as shown in FIG. 12*b*. Finally, one pulls the respective straps 60 around the rolled up sheet 20*a* (i.e. a scroll) as shown in FIG. 12*c* and attaches the end 62 of each strap 60 to respective hooks 49.

It now will be clear that the present stroller shade has features and advantages not found in prior stroller shades. One feature is provided by the unique clamp which includes an inner clip and an outer clip for releasably clamping or clipping the stroller shade to a stroller.

An additional feature an advantage of the present stroller shade is a clamp which allows one to selectively roll up a panel covering a mesh window of the shade as well as the same strap system which can be used to hold in place a rolled up entire shade (i.e. sheet 20) as a scroll, without removing the shade 10 from the stroller altogether.

A further feature of the present shade is one which can be attached to stroller using clips or clamps attached only to a top bar of a stroller, and elastic at one opposite end of the shade to be disposed below a seat of the stroller to thereby more easily accommodate a selective rolled up shade position or shade in place position. As a result, one can easily transform a stroller from having the shade in place and having the shade not in place or merely having the window panel accessible.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

What is claimed is:
1. A clamp comprising:
an inner clip having an inner clip top member and an inner clip bottom member pivotally joined to each other at one end forming a closed inner clip end and an open inner clip end opposite the closed inner clip end, the inner clip top member and the inner clip bottom member separateable at the inner clip open end to accommodate sliding placement on a bar;
an outer clip having an outer clip top portion and an outer clip bottom portion joined together at an outer clip closed end and having an outer clip open end opposite the outer clip closed end, the outer clip having a sufficient size to slidingly fit over the inner clip top member and the inner clip bottom member, the outer clip bottom member having a wider width portion at the open end than the closed end; and
a pair of channels formed on opposite sides of the inner clip bottom member adapted to accommodate the wider width portion of outer clip bottom member to allow sliding of the outer clip relative to the inner clip, the pair of channels having respective ends proximate the inner clip closed end which abut the wider width portion of the outer clip when the outer clip is slid in a direction towards the open end, to thereby prevent the outer clip from completely sliding away from the inner clip when sliding the outer clip in the direction of the inner clip closed end,
wherein each of the channels are formed as slot through part of the inner clip bottom member which extends radially below a remaining portion of the inner clip bottom member, in the direction of the outer bottom member, wherein the wider width portion of the outer clip slides in the slot.

2. The clamp of claim 1, wherein the slots are completely through the inner clip bottom member.

3. The clamp of claim 2, wherein the slots accommodate a strap which can pass therethrough.

4. The clamp of claim 1, wherein the outer clip top member further comprises a tab extending radially inward from the inner clip top member and the inner clip top member has a complementary surface for releasably locking the outer clip to the inner clip.

5. The clamp of claim 4, wherein the complementary surface is formed by a portion of a surface of the inner clip, facing the outer clip, being lower than a remaining portion of the inner clip.

6. The clamp of claim 1, further comprises an elastic strap attached at one end to the inner clip and releasably attached to the inner clip on another end, to selectively form a loop.

7. The claim of claim 6, wherein the inner clip upper member further comprises a hook extending radially upward in a direction opposite the bottom member, the hook accommodating an end of the strap to selectively form the loop.

8. A stroller shade, the shade comprising,
a sheet composed of a breathable material; and
a plurality of clamps joined to the sheet for selectively clipping the sheet to a stroller, each clamp comprising:
an inner clip having an inner clip top member and an inner clip bottom member pivotally joined to each other at one end forming a closed inner clip end and an open inner clip end opposite the closed inner clip end, the inner top member and the bottom top member separateable at the inner clip open end to accommodate sliding placement on a stroller bar;
an outer clip having an outer clip top portion and outer portion member joined together at an outer clip closed end and having an outer clip open end opposite the outer clip closed end, the outer clip having a sufficient size to slidingly fit over the inner clip top member and inner clip bottom member, the bottom member having a wider width portion at the open end than the closed end; and
an elastic strap attached at one end to the inner clip and releasably attached to the inner clip on another end, to selectively form a loop.

9. The stroller shade of claim 8, wherein the sheet has a mesh window.

10. The stroller shade of claim 9, further comprising a panel attached on at least on end to the sheet over the mesh window for selectively covering the mesh window.

11. The stroller shade of claim 10, wherein the panel is selectively attached to the shade on an end opposite the at least on end of the panel attached to the shade, using a magnetic fastener.

12. The stroller shade of claim 8, wherein the outer clip top member further comprises a tab extending radially inward from the inner clip top member and the inner clip top member has a complementary surface for releasably locking the outer clip to the inner clip.

13. The stroller shade of claim 12, wherein the complementary surface is formed by a portion of a surface of the inner clip, facing the outer clip, being lower than a remaining portion of the inner clip.

14. The stroller shade of claim 8, wherein the inner clip upper member further comprises a hook extending radially upward in a direction opposite the bottom member, the hook accommodating an end of the strap to selectively form the loop.

15. The stroller shade of claim 14, wherein the sheet can be rolled up starting at one end towards the other end to form a scroll and one or more of the elastic straps can form one or more respective loops around the scroll to prevent the scroll from unrolling.

16. The stroller shade of 9, wherein part of the inner bottom member extends radially below a remaining portion of the inner clip bottom member, in the direction of the outer bottom member, and a slot is formed completely through the part.

17. The stroller shade of 16, wherein series of strips are attached at each end to the sheet proximate a perimeter of the sheet and the strip pass through respective slots allowing the clamp to slide along the strip.

18. The stroller shade of claim 17, wherein the strips have a loop or hook surface which mates with complementary hook or look surfaces of the sheet to selectively hold a respective clamp in place along the sheet.

19. A stroller shade, the shade comprising,
a sheet composed of a breathable material, the sheet have a top portion and a bottom portion, the bottom portion having a suitable dimension for fitting on a stroll proximate its seat; and
a plurality of clamps joined to the sheet, proximate the top portion of the sheet, for selectively clipping the sheet to a stroller, and
a plurality of straps connected to the clamps,
wherein, the sheet can be rolled up, starting, from the bottom portion, toward the top portion, to form a scroll and held to the clamps using the straps associated with respective clamps.

20. The stroller shade of claim 19, wherein an elastic strip is joined to the bottom portion for allowing tight connection of the sheet to a stroller at the bottom portion of the sheet.

21. The stroller shade of claim 19, wherein the plurality of straps are elastic.

22. The stroller said of claim 21, wherein the elastic straps are in the form of a loop which can stretch around the sheet when rolled as a scroll, and attached over a portion of the clamp to keep the sheet rolled up as the scroll.

23. A clamp comprising:
an inner clip having an inner clip top member and an inner clip bottom member pivotally joined to each other at one end forming a closed inner clip end and an open inner clip end opposite the closed inner clip end, the inner clip top member and the inner clip bottom member separateable at the inner clip open end to accommodate sliding placement on a bar;
an outer clip having an outer clip top portion and an outer clip bottom portion joined together at an outer clip closed end and having an outer clip open end opposite the outer clip closed end, the outer clip having a sufficient size to slidingly fit over the inner clip top member and the inner clip bottom member, the outer clip bottom member having a wider width portion at the open end than the closed end;
a pair of channels formed on opposite sides of the inner clip bottom member adapted to accommodate the wider width portion of outer clip bottom member to allow sliding of the outer clip relative to the inner clip, the pair of channels having respective ends proximate the inner clip closed end which abut the wider width portion of the outer clip when the outer clip is slid in a direction towards the open end, to thereby prevent the outer clip from completely sliding away from the inner clip when sliding the outer clip in the direction of the inner clip closed end, and an elastic strap attached at one end to the inner clip and releasably attached to the inner clip on another end, to selectively form a loop.

24. A stroller shade, the shade comprising, a she composed of a breathable material; and a plurality of clamps joined to the sheet for selectively clipping the sheet to a stroller, each clamp comprising:

an inner clip having art inner clip top member and an inner clip bottom member pivotally joined to each other at one end forming a closed inner clip end and an open inner clip end opposite the closed inner clip end, the inner top member and the bottom top member separateable at the inner clip open end to accommodate sliding placement on a stroller bar; and an outer clip having an outer clip top portion and outer portion member joined together at an outer clip closed end and having an outer clip open end opposite the outer clip closed end, the outer clip having a sufficient size to slidingly fit over the inner clip top member and inner clip bottom member, the bottom member having a wider width portion at the open end than the closed end, wherein part of the inner bottom member extends radially below a remaining portion of the inner clip bottom member, in the direction of the outer bottom member, and a slot is formed completely through the part.

* * * * *